United States Patent [19]

Teraoka

[11] Patent Number: 4,962,837
[45] Date of Patent: Oct. 16, 1990

[54] VISCOUS COUPLING CLUTCH

[75] Inventor: Masao Teraoka, Tochigi, Japan

[73] Assignee: Tochigifujisangyo Kabushiki Kaisha, Japan

[21] Appl. No.: 437,461

[22] Filed: Nov. 14, 1989

[30] Foreign Application Priority Data

Nov. 14, 1988 [JP] Japan .................. 63-285820
Nov. 29, 1988 [JP] Japan .................. 63-299756

[51] Int. Cl.$^5$ .......................... F16D 31/00
[52] U.S. Cl. ............................ 192/58 C
[58] Field of Search ............. 192/58 R, 58 A, 58 B, 192/58 C

[56] References Cited

U.S. PATENT DOCUMENTS

| 3,101,825 | 8/1963 | Caroli et al. | 192/58 C |
| 4,058,027 | 11/1977 | Webb | 192/58 C |
| 4,503,952 | 3/1985 | Hesse | 192/58 B |
| 4,562,847 | 1/1986 | Renneker | 192/58 B |
| 4,712,663 | 12/1987 | Teraoka | 192/58 A |
| 4,782,930 | 11/1988 | Kuroiwa et al. | 192/58 R |
| 4,844,219 | 7/1984 | Stockmar | 192/58 R |

FOREIGN PATENT DOCUMENTS

62-32232 2/1987 Japan .
62-106130 5/1987 Japan .

Primary Examiner—Leslie A. Braun
Assistant Examiner—Nicholas Whitelaw
Attorney, Agent, or Firm—Marger, Johnson, McCollom & Stolowitz

[57] ABSTRACT

To obtain a wide transmission torque adjustable range at a short stroke in a viscous coupling clutch including a first rotatable member and a second rotatable member rotatably and slidably disposed relative to the first rotatable member so as to form a working chamber filled with a viscous fluid, without increasing the clutch size and cost, first and second cylinder assemblies of different diameters are coaxially fixed to the first and second rotatable members, respectively in such a way that a radial thickness of each of the resistance cylinder members changes stepwise along the axial direction thereof to stepwise change the overlap and gap (i.e. viscous coupling) conditions between the first and second cylinder assemblies, when the first rotatable member is moved axially relative to the second rotatable member.

5 Claims, 9 Drawing Sheets

VISCOUS COUPLING CLUTCH

BACKGROUND OF THE INVENTION

1. Field of the Invention

The present invention relates to a viscous coupling clutch and more specifically to a viscous coupling clutch whose transmission torque is adjustable, when a first rotatable member is moved axially relative to a second rotatable member so that the overlap and gap conditions between first and second resistance cylinder assemblies change within a working chamber filled with a viscous fluid.

2. Description of the Prior Art

Figure 1A:
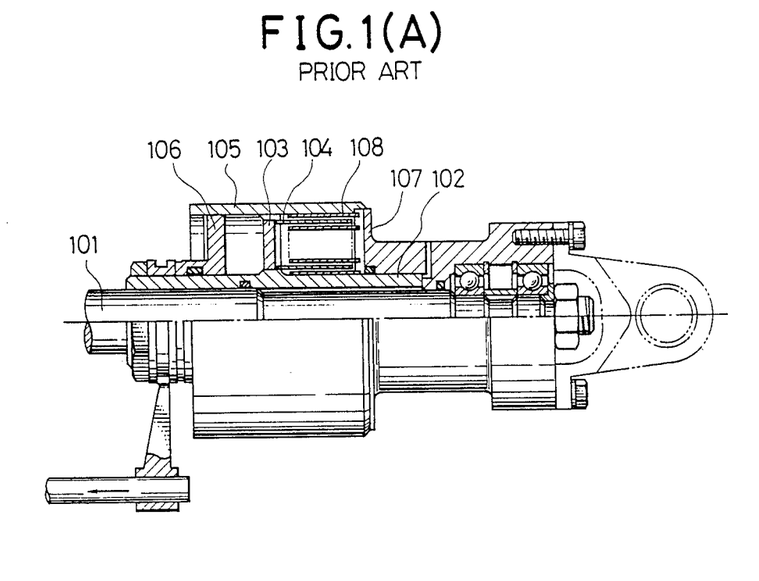
FIG. 1(A) is a cross-sectional view showing a first prior-art viscous coupling clutch.

An example of viscous coupling clutches of overlapped resistance cylinder type whose transmission torque can be adjusted is disclosed in Japanese Published Unexamined (Kokai) Patent Appli. No. 62-106130, as shown in FIG. 1(A). In the drawing, a driving (input) side includes an input shaft 101, a slidable sleeve 102 spline coupled to the input shaft 101 so as to be slidable relative to the input shaft 101 in the axial direction thereof, a flange portion 103 fixed to or formed integral with the slidable sleeve 102, and a plurality of driving side resistance cylinders 104 of different diameters fixed to the flange portion 103 in coaxially and radially spaced positional relationship to each other. A driven (output) side includes a housing 105, a first side wall 106 fixed to one end of the housing 105 so as to be rotatable and axially slidable relative to the slidable sleeve 102, a second side wall 107 fixed to the other end of the housing 105 also so as to be rotatable and axially slidable relative to the slidable sleeve 102, and a plurality of driven side resistance cylinders 108 of different diameters fixed to the second side wall 107 in coaxially and radially spaced positional relationship to each other so as to be overlapped with and interposed between the driving side resistance cylinders 104 at small radial intervals. Further, the housing 105 is filled with a viscous fluid with a high viscosity.

Therefore, when the slidable sleeve 102 is moved in the axial direction thereof, since the driving side resistance cylinders 104 fixed to the slidable sleeve 102 are slid relative to the housing 105, it is possible to adjust the viscous coupling condition, that is, a torque generated by a shearing force between the two driving and driven side resistance cylinders 104 and 108.

In the above-mentioned prior-art viscous coupling clutch, the overlap condition of the two driving and driven side resistance cylinders 104 and 108 is changed in order to adjust the torque transmitted from the driving side to the driven side. In other words, a stroke of the slidable sleeve 102 is adjusted relative to the housing 105 to adjust the torque. Therefore, in order to obtain a sufficient adjustable range of the transmission torque between the two driving and driven sides, a relatively long stroke of the slidable sleeve 102 and therefore a relatively long axial length of the resistance cylinders 104 and 108 is inevitably required, thus resulting in a problem in that the size of the viscous coupling clutch increases and therefore the response speed of the clutch in response to a control signal decreases or a large energy is required for the actuator to improve the response speed.

Figure 1B:
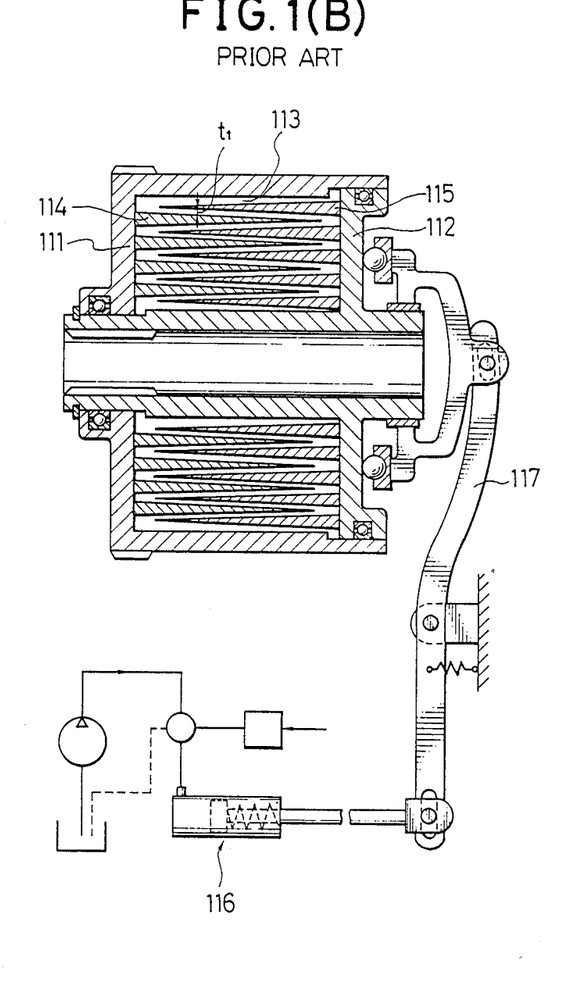
FIG. 1(B) is an cross-sectional view including a block diagram showing a second prior-art viscous coupling clutch.

Another example of viscous coupling clutches of overlapped resistance cylinder type whose transmission torque can be adjusted is disclosed in Japanese Published Unexamined (Kokai) Utility Model Appli. No. 62-32232, as shown in FIG. 1(B). This viscous coupling clutch is designed so as to be usable as a differential limiting device incorporated in a center differential gear for four-wheel drive vehicles. In the drawing, a first housing 111 is spline coupled to a front wheel driving shaft (not shown) of the center differential gear, and a second housing 112 is spline coupled to a rear wheel driving shaft (not shown) of the center differential gear so as to be rotatable relative to the first housing 111. In the same way, a working chamber 113 is formed between the first and second housings 111 and 112 and filled with a viscous fluid. Within the working chamber 113, a plurality of first resistance cylinders 114 of different diameters are fixed to the first housing 111 in coaxially and radially spaced positional relationship to each other, and a plurality of second resistance cylinders 115 of different diameters are fixed to the second housing 112 in coaxially and radially spaced positional relationship to each other so as to be overlapped with and interposed between the two first resistance cylinders 115 at small radial intervals. The feature of this viscous coupling clutch is to form the resistance cylinders 114 and 115 in such a way that a radial wall thickness of each resistance cylinder decreases gradually from the fixed end to the free end thereof.

When the vehicle travels straight on a paved road, since the first housing 111 coupled to a front wheel drive shaft and the second housing 112 coupled to a rear wheel drive shaft both rotate at the same speed, no differential limiting torque is generated between the two housing 111 and 112.

When the vehicle travels on a muddy road or turns, that is, when road surface and travelling conditions change, a difference in speed is produced between the two housings 111 and 112. Therefore, the viscous fluid within the working chamber 113 is sheared by the first and second resistance cylinders 114 and 115, so that a torque is transmitted from the first housing 111 to the second housing 112 or vice versa.

When the transmission torque between the two housings is required to be adjusted according to the necessity, an actuator 116 is activated to pivot a pivotal lever 117 so that the second housing 112 is moved toward or separated from the first housing 111. When the second housing 112 is adjustably moved relative to the first housing 111, since the radial gap $t_1$ between the first and second resistance cylinders 114 and 115 and also the overlap condition of the two cylinders 114 and 114 are changed, the shearing resistance of the viscous fluid changes and therefore the transmission torque is adjusted. As described above, the differential limiting torque of the center differential gear is adjusted according to road and travelling conditions for providing a safe vehicle driving.

In the above-mentioned second prior-art viscous coupling clutch, however, since the radial cross-section of each of the first and second resistance cylinders 114 and 115 must be formed into a triangular shape so that the radial wall thickness thereof gradually decreases from the fixed end to the free end thereof, there exists another problem in that it is difficult to manufacture the above-mentioned resistance cylinders 114 and 115 with a triangular radial cross section and therefore the manufacturing cost thereof inevitably rises.

SUMMARY OF THE INVENTION

With these problems in mind, therefore, it is the primary object of the present invention to provide a viscous coupling clutch whose transmission torque can be adjusted largely by sliding a slidable member at a relatively short stroke without increasing both the clutch size and the manufacturing cost.

To achieve the above-mentioned object, the viscous coupling clutch according to the present invention comprises: (a) a first rotatable member (17); (b) a second rotatable member (20) rotatably and slidably disposed relative to said first rotatable member so as to form a working chamber (24) filled with a viscous fluid; (c) a first cylinder assembly (25, 65) having plural first resistance cylinder members of different diameters and coaxially fixed to said first rotatable member within the working chamber, a radial thickness of each of said first resistance cylinder members changing stepwise along an axial direction thereof; (d) a second cylinder assembly (26, 66) having plural second resistance cylinder members of different diameters and coaxially fixed to said second rotatable member within the working chamber, a radial thickness of each of said second resistance cylinder member changing stepwise along the axial direction thereof, said first and second resistance cylinder members being engaged with each other in radially spaced and axially slidable positional relationship to each other so that overlap and gap conditions between said first and second resistance cylinder members change stepwise and therefore viscous coupling conditions change stepwise within the working chamber, when said first and second rotatable members are axially moved relative to each other.

In the first embodiment, each of the first and second resistance cylinder members of different diameters comprises: (a) an axially long cylinder member (25a, 26a); and (b) an axially short cylinder member (25b, 26b) attached to an inner circumferential surface of said long cylinder member so that a radial thickness of said resistance cylinder member increases stepwise from a fixed end to a free end thereof. In the second embodiment, each of the first and second resistance cylinder members of different diameters comprises: (a) an axially long cylinder member (31a, 32a); (b) a first axially short cylinder member (31b, 32b) attached to an inner circumferential surface of said long cylinder member; and (c) a second axially short cylinder member (31c, 32c) attached to an outer circumferential surface of said long cylinder member so that a radial thickness of said resistance cylinder member increases stepwise from a fixed end to a free end thereof. In the third embodiment, each of the first and second resistance cylinder members of different diameters comprises: (a) an axially long cylinder member (41a, 42a); (b) an axially medium cylinder member (41b, 42b) attached to an inner circumferential surface of said long cylinder member; and (c) an axially short cylinder member (41c, 42c) attached to an inner circumferential surface of said medium cylinder member so that a radial thickness of said resistance cylinder member increases stepwise from a fixed end to a free end thereof. Further, in the fourth embodiment, each of the first and second resistance cylinder members of different diameters comprises a cylindrical member (65a, 66a) formed with a plurality of slits arranged in circumferential and axial directions thereof so that a substantial thickness of said resistance cylinder member changes partially stepwise from a fixed end to a free end thereof along an axial direction thereof.

In the viscous coupling clutch according to the present invention, when the first rotatable member rotates relative to the second rotatable member, since the viscous fluid within the working chamber is sheared, a torque is transmitted between the two rotatable members. To adjust the transmission torque, the first rotatable member is axially moved relative to each other. In this case, since each resistance cylinder is so formed that the radial thickness thereof changes stepwise along the axial direction thereof, it is possible to stepwise change not only the overlap condition but also the gap condition between the first and second resistance cylinder assemblies, thus providing a large transmission torque adjustable range between the two rotatable members in spite of a relatively short stroke, without increasing the clutch size and the manufacturing cost.

BRIEF DESCRIPTION OF THE DRAWINGS

The features and advantages of the viscous coupling clutch according to the present invention will be more clearly appreciated from the following description taken in conjunction with the accompanying drawings in which.

DETAILED DESCRIPTION OF THE PREFERRED EMBODIMENTS

Figure 2:
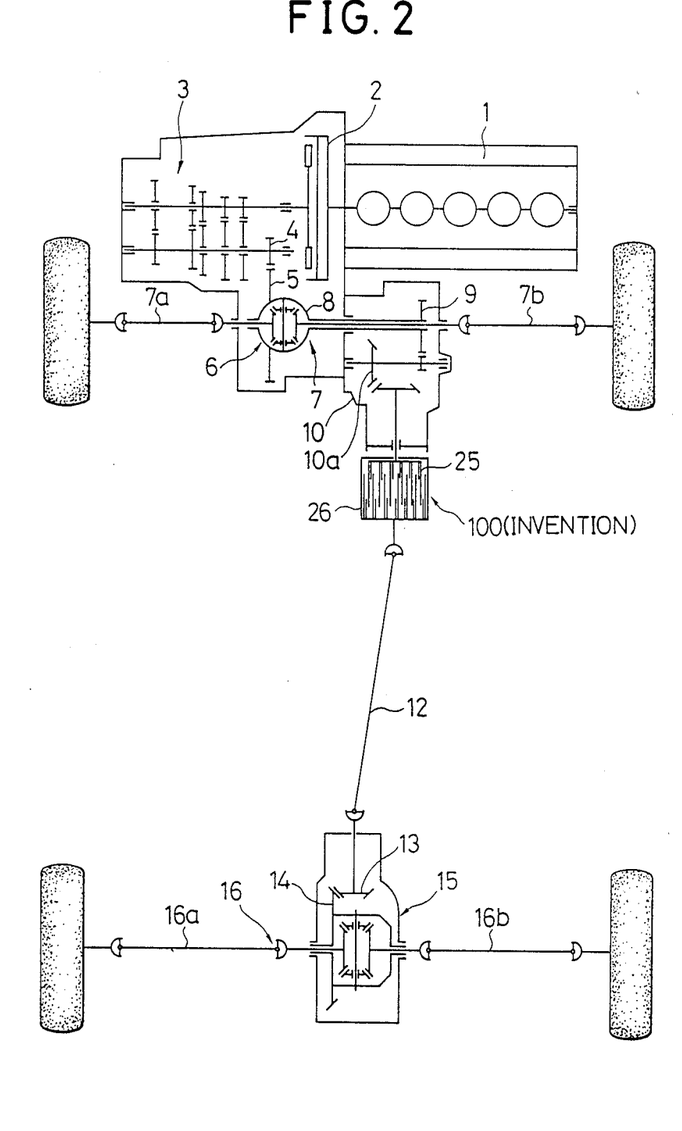
FIG. 2 is a skeletal diagram for assistance in explaining a power transmission system for a four-wheel drive vehicle, to which the clutch according to the present invention is applied.

A power transmission system for an automotive vehicle on which the clutch according to the present invention is mounted will first be described by way of example. The viscous coupling clutch is coupled between a front wheel drive shaft and a rear wheel drive shaft of an FF (Front-engine Front-drive) based four-wheel drive vehicle, for example, as shown in FIG. 2. A torque outputted from an internal combustion engine 1 is transmitted to a transmission 3 via a clutch 2. The transmitted torque is further transmitted from a drive gear 4 of the transmission 3 to a front wheel side differential gear 6 via a ring gear 5 and then to a front wheel drive shaft 7 composed of a left wheel drive shaft 7a and a right wheel drive shaft 7b. A torque transmitted to a differential case 8 of the differential gear 6 is then transmitted to a power transmission gear 9, and its torque direction is changed at a right angle by a change-direction gear assembly 10a of a transfer 10. The torque whose direction is changed is transmitted to a propeller shaft 12 via the viscous coupling clutch 100 according to the present invention. The transmitted torque is further transmitted from a drive pinion 13 to a rear wheel side differential gear 15 via a ring gear 14 and then to a rear wheel drive shaft 16 composed of a left wheel drive shaft 16a and a right wheel drive shaft 16b.

Figure 3A:
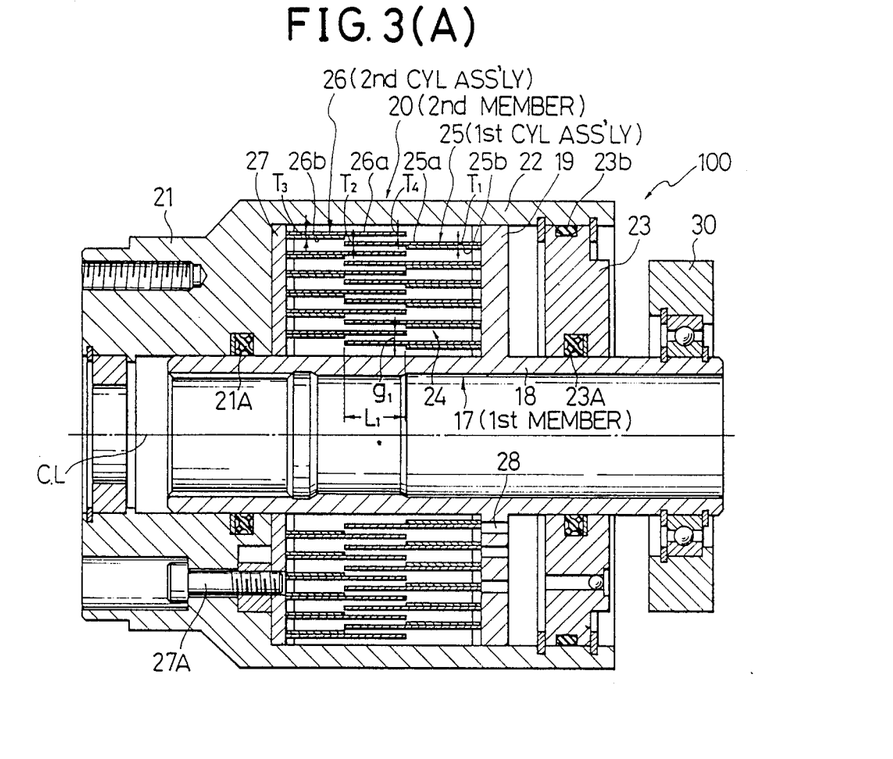
FIG. 3(A) is a cross-sectional view showing a first embodiment of the viscous coupling clutch according to the present invention, in which the overlap distance of two resistance cylinders is short to provide a relatively small shearing force.
Figure 3B:
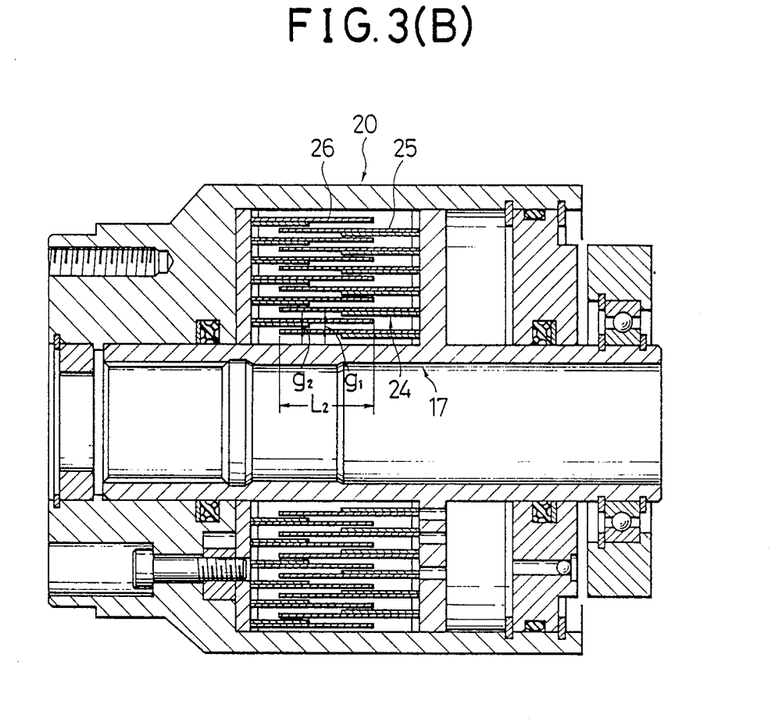
FIG. 3(B) is a similar cross-sectional view showing the first embodiment, in which the overlap distance is long to provide a relatively large shearing force.

A first embodiment of the viscous coupling clutch 100 will be described with reference to FIGS. 3(A) and 3(B). The clutch 100 comprises a first rotatable member 17 spline coupled to an output (drive) shaft of the transfer 10 and a second rotatable member 20 rotatably supported by the first rotatable member 17. The first rotatable member 17 is composed of a central hollow shaft portion 18 into which the transfer output shaft is spline coupled and a flange portion 19 fixed to or formed integral with the central hollow shaft portion 18. The second rotatable member 20 is composed of a cylindrical shaft portion 21 rotatably and slidably fitted to the outer circumferential surface of the central hollow shaft portion 18 via a sealing member 21A, a cylindrical casing portion 22 coaxially fixed to or formed integral with the cylindrical shaft portion 21, and an annular side wall portion 23 rotatably and slidably disposed via sealing members 23A and 23B between the hollow shaft portion 18 and the cylindrical casing portion 22. The first and second rotatable members 17 and 20 can be rotated and slid relative to each other about and along a central axial line (C. L) of the hollow shaft portion 18. Further, a working chamber 24 is formed by the cylindrical shaft portion 21, the cylindrical casing portion 22, the annular side wall portion 23, and the central hollow shaft portion 18, being filled with a viscous fluid such as silicon oil. Further, an annular support plate 27 is fixed to the inner surface of the cylindrical shaft portion 21 of the second rotatable member 20 with bolts 27A so as to be opposed to the flange portion 19 of the first rotatable member 17 axially slidably disposed within the working chamber 24.

Within the working chamber 24, a first cylinder assembly 25 is fixed to the inner surface of the flange portion 19, and a second cylinder assembly 26 is fixed to the inner surface of the annular support plate 27. The first cylinder assembly 25 is composed of a plurality (six in FIG. 3) of first resistance cylinder members of different diameters fixed to the inner surface of the flange portion 19 in coaxially and radially spaced positional relationship to each other. Each of the first resistance cylinder members is composed of an axially long (outside) cylinder member 25a and an axially short (inside) cylinder member 25b. The short cylinder member 25b is attached to the inner circumferential surface of the long cylinder member 25a so that the radial wall thickness of the resistance cylinder member increases stepwise from the fixed ($T_1$) end to the free end thereof ($T_2$).

In the same way, the second cylinder assembly 26 is composed of a plurality (six in FIG. 3) of second resistance cylinder members of different diameters fixed to an inner surface of the annular support plate 27 in coaxially and radially spaced positional relationship to each other so as to be engaged with and interposed between two of the first resistance cylinder members. Each of the second resistance cylinder members is composed of an axially long (outside) cylinder member 26a and an axially short (inside) cylinder member 26b. The short cylinder member 26 is attached to the inner circumferential surface of the long cylinder member 26a so that the radial wall thickness of the resistance cylinder member increases stepwise from the fixed end ($T_3$) to the free end thereof ($T_4$).

Further, since the first and second rotatable members 17 and 22 are axially slidable relative to each other, the flange portion 19 of the first rotatable member 17 moves toward or from the annular support plate 27 of the second rotatable member 20. To facilitate the relative slidable motion of the two rotatable members 17 and 20, the flange portion 19 is formed with a plurality of communication holes 28 through which the viscous fluid flows. Further, the reference numerals 30 denotes a shifter actuated by an actuator (not shown) to slide the first rotatable member 17 relative to the second rotatable member 20. Further, the first rotatable member 17 is slid to the leftmost position when the shifter 30 is brought into contact with the outer surface of the side wall portion 23 and to the rightmost position when the flange portion 19 is brought into contact with the inner surface of the side wall portion 23.

The function of the viscous coupling clutch 100 according to the present invention will be described hereinbelow.

When the vehicle travels straight ahead on a paved road, although torque of the engine 1 is transmitted to the front wheel drive shaft 7 via the transmission 3 and then to the transfer 10, since the rotative speed of the front wheels is substantially the same as that of the rear wheels, no torque is transmitted via the viscous coupling clutch 100 from the transfer 10 to the propeller shaft 12, so that the vehicle is driven substantially in front wheel drive mode. In this case, the first and second rotatable members 17 and 20 of the clutch 100 rotate at the same speed.

When the vehicle travels on a muddy road whose friction coefficient is small and therefore the front wheels slip, although the first rotatable member 17 coupled to the front wheel drive shaft 7 is directly driven by the engine 1, since the friction coefficient (resistance) of the front wheels is small, the front wheels slip and therefore a small torque is transmitted to the slipping front wheels which rotate at a high rotative speed. On the other hand, since the rear wheels rotate at a rotative speed lower than that of the front wheels, the second rotatable member 20 coupled to the rear wheels 16 also rotates at a speed lower than that of the first rotatable member 17. Therefore, a difference in rotative speed is produced between the two rotatable members 17 and 20, and therefore the second cylinder assembly 26 fixed to the second rotatable member 20 rotates at a speed lower than that of the first cylinder assembly 25 fixed to the first rotatable member 17. Since the silicon oil is sheared between the first and second cylinder assemblies 25 and 26, a torque is transmitted from the first rotatable member 17 to the second rotatable member 20 on the basis of a shearing force (torque) generated by the viscous coupling clutch 100. The transmitted torque is further transmitted to the rear wheels via the rear wheel drive shaft 16. As a result, the rear wheels can drive the vehicle whose front wheels are slipping from a muddy road.

In the viscous coupling clutch 100 according to the present invention, when the first and second rotatable members 17 and 20 are moved relative to each other along the central axial direction CL by actuating the shifter 30, the overlap and gap conditions between the first and second cylinder assemblies 25 and 26 change. In more detail, when the first and second rotatable members 17 and 20 are engaged as shown in FIG. 3(A), the overlap distance of the two resistance cylinders 25 and 26 is $L_1$ and the gap width thereof is $g_1$. However, when the first rotatable member 17 is moved relative to the second rotatable member 20 in the leftward direction as shown in FIG. 3(B), the overlap distance thereof increases from $L_1$ to $L_2$ and the gap width thereof partially decreases from $g_1$ to $g_2$ at each free end of the resistance cylinder members. Therefore, when the first and second rotatable members 17 and 20 are engaged as shown in FIG. 3(B), since the overlap length increases and the gap width decreases partially, the shearing force of the silicon oil by the two cylinder assemblies 25 and 26 increases as compared with the case as shown in FIG. 3(A), so that a higher torque can be transmitted from the first rotatable member 17 coupled to the front wheels to the second rotatable member 20 coupled to the rear wheels. In other words, it is possible to adjust the transmission torque of the viscous coupling clutch 100 by adjustably sliding the first rotatable member 17 relative to the second rotatable member 20 according to the road surface and travelling conditions.

Further, when the vehicle is put into a garage, although a big difference in rotative speed is produced between the front and rear wheels or between the right and left wheels, since this difference in rotative speed can be absorbed by the clutch 100, it is possible to prevent the so-called tight corner braking phenomenon.

In the viscous coupling clutch 100 according to the present invention, since both the overlap and gap conditions between the first and second cylinder assemblies 25 and 26 can be adjusted stepwise, it is possible to obtain a big adjustable range of the silicon oil shearing force or of the transmission torque, in spite of a relatively short adjusting stroke of the first rotatable member 17 relative to the second rotatable member 20, thus reducing the size of the viscous coupling clutch as compared with the prior-art clutch as shown in FIG. 1(A).

Further, the gap width between the two cylinder assemblies 25 and 26 can be adjusted stepwise by combining each axially long (outside) cylinder member 25a or 26a and each axially short (inside) cylinder member 25b and 26b in such a way that the radial wall thickness thereof decreases stepwise from the fixed end to the free end, it is possible to facilitate the manufacturing process and therefore to reduce the manufacturing cost, as compared with the prior-art clutch as shown in FIG. 1(B) in which each resistance cylinder is formed into triangular shape in radial cross section.

Figure 4:
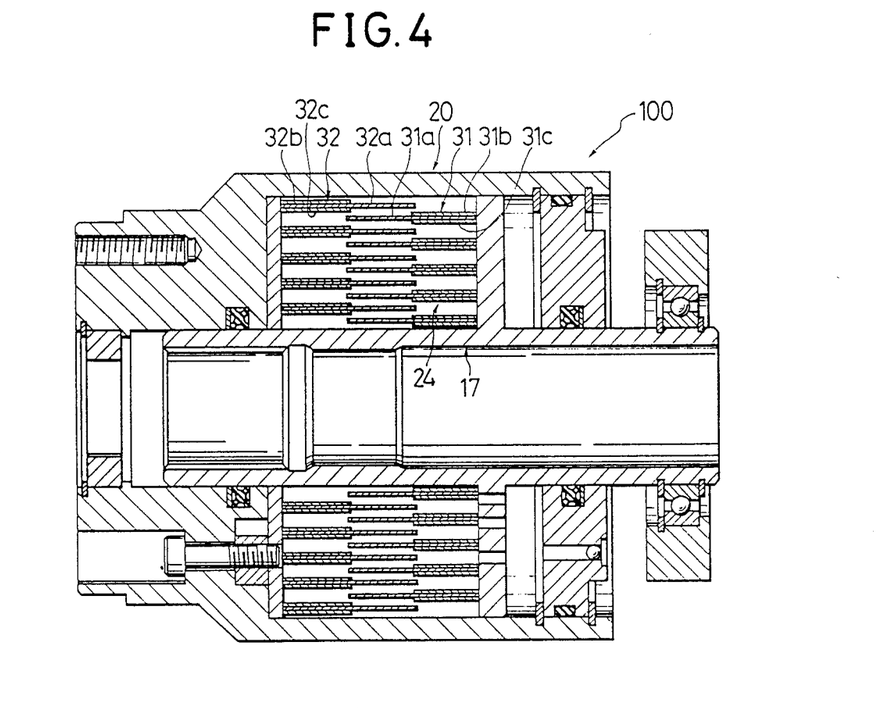
FIG. 4 is a cross-sectional view showing a second embodiment of the viscous coupling clutch according to the present invention.

FIG. 4 shows a second embodiment of the viscous coupling clutch 100 according to the present invention. In this embodiment, each of the first resistance cylinder members 31 is composed of an axially long (intermediate) cylinder member 31a and two axially short (inside and outside) cylinder members 31b and 31c in such a way that each long cylinder member 31a is sandwiched between the two short cylinder members 31b and 31c by attaching the short cylinder member 31b to the outer circumferential surface of the long cylinder member 31a and the short cylinder member 31c to the inner circumferential surface thereof so that the radial wall thickness of the resistance cylinder member increases stepwise from the fixed end to the free end thereof. In the same way, each of the second resistance cylinder members 32 is composed of an axially long (intermediate) cylinder member 32a and two axially short (inside and outside) cylinder members 32b and 32c in such a way that each long cylinder member 32a is sandwiched between the two short cylinder members 32b and 32c by attaching the short cylinder members 32b and 32c to the inner and outer circumferential surfaces of the long cylinder member 32a so that the radial wall thickness increases stepwise from the fixed end to the free end thereof.

Figure 5:
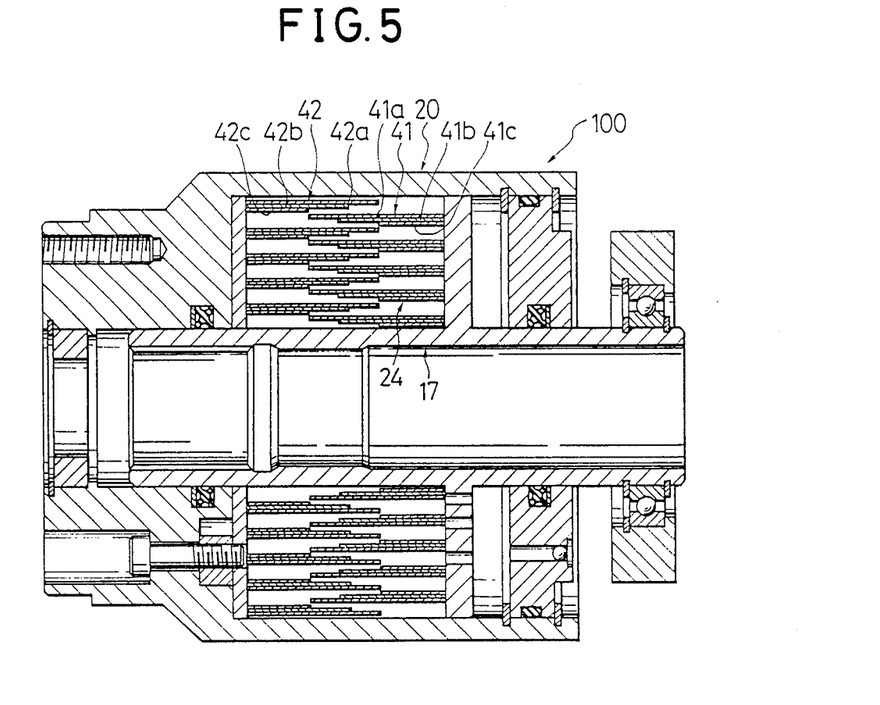
FIG. 5 is a cross-sectional view showing a third embodiment of the coupling clutch according to the present invention.

FIG. 5 shows a third embodiment of the viscous coupling clutch 100 according to the present invention. In this embodiment, each of the first resistance cylinder members 41 is composed of an axially long (outside) cylinder member 41a, an axially medium (intermediate) cylinder member 41b, and an axially short (inside) cylinder member 41c in such a way that each medium cylinder 41b is sandwiched between the two long and short cylinders 41a and 41c. In the same way, each of the second resistance cylinder members 42 is composed of an axially long (outside) cylinder member 42a, an axially medium (intermediate) cylinder member 42b, and an axially short (inside) cylinder member 42c in such a way that each medium cylinder 41b is sandwiched between the two long and short cylinders 42a and 42c.

Figure 6A:
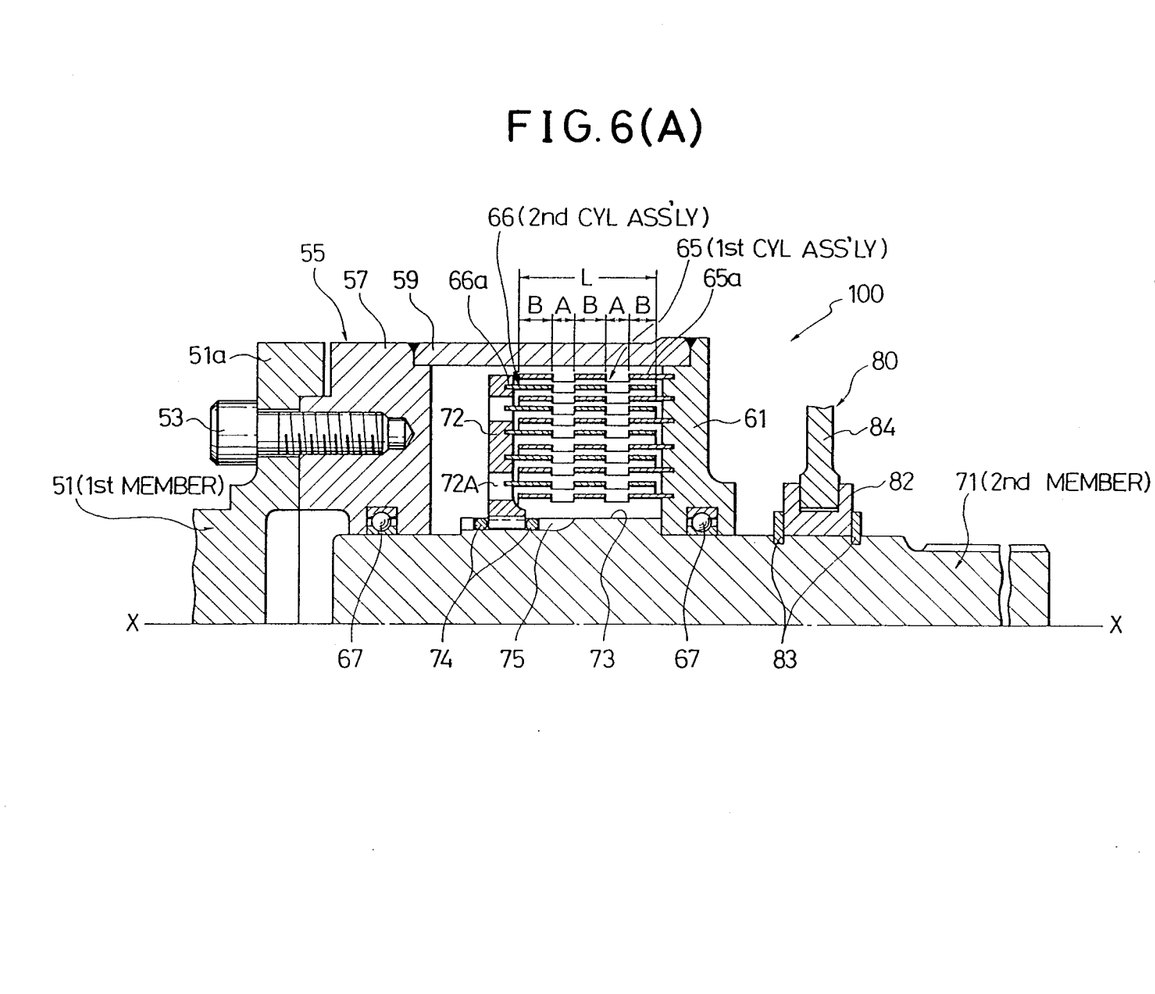
FIG. 6(A) is a half cross-sectional view showing a fourth embodiment of the viscous coupling clutch according to the present invention, in which the overlap distance of the two resistance cylinders is long to provide a relatively large shearing force.
Figure 6B:
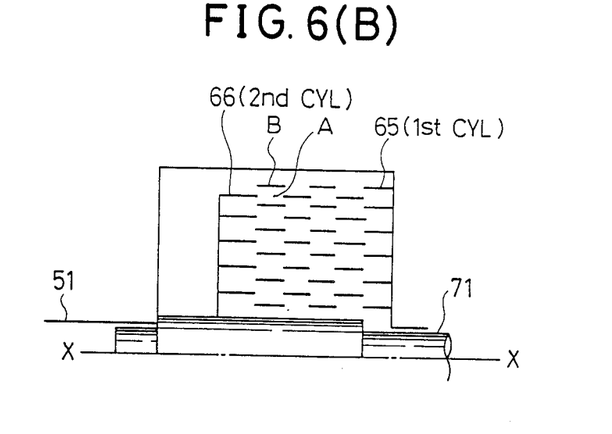
FIG. 6(B) is a similar cross-sectional view of the fourth embodiment, in which the overlap distance is short to provide a relatively small shearing force.
Figure 7:
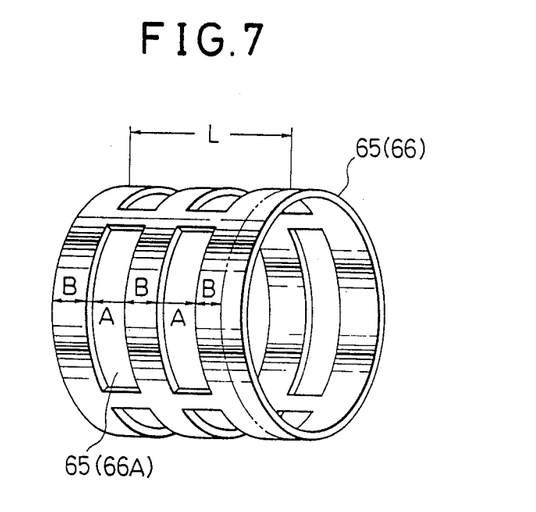
FIG. 7 is an enlarged perspective view showing the resistance cylinder.

FIGS. 6(A), 6(b) and 7 show a fourth embodiment of the viscous coupling clutch 100 according to the present invention. In this embodiment, a first (input) rotatable member 51 is composed of a flange portion 51a fixed with bolts to a clutch housing 55 formed by an annular end plate 57, a cylindrical member 59 welded to the annular end plate 57, and another annular end plate 61 also welded to the cylindrical member 59. A second (output) rotatable member 71 is rotatably and slidably fitted to the first rotatable member 51 via an X-shaped (in cross section) sealing ring 67. An annular member 72 formed with plural through holes 72A is spline engaged with male splines 75 formed in a large diameter portion 73 of the second rotatable member 71, and further fixed thereto by two wire retainer clips 74 so as to oppose the annular end plate 61.

Therefore, a working chamber is formed by the annular end plate 57, the cylindrical member 59, the annular end plate 61 and thé second rotatable member 71 and filled with a viscous fluid such as a silicon oil.

Within the working chamber, a first cylinder assembly 65 is fixed to the inner surface of the annular end plate 61, and a second cylinder assembly 66 is fixed to the inner surface of the annular member 72. The first cylinder assembly 65 is composed of a plurality (six in FIG. 6) of first resistance (clutch) cylinder members of different diameters fixed to an inner surface of the annular end plate 61 of the first rotatable member 51 in coaxially and radially spaced positional relationship to each other. In the same way, the second cylinder assembly 66 is composed of a plurality (five in FIG. 6) of second resistance (clutch) cylinder members of different diameters fixed to the annular member 72 of the second rotatable member 71 in coaxially and radially spaced positional relationship to each other.

As depicted in FIG. 7, each resistance cylinder member is formed with a plurality (eight in FIG. 7) of circular arc shaped slits 65A or 66A arranged along the circumferential and axial directions thereof. That is, the circumferential surface of each resistance cylinder member is divided into two window-presence (zero thickness) zones A and three window-absence (a predetermined thickness) zones B along the axial direction thereof.

Further, in FIG. 6(A), the reference numeral 80 denotes a shifter for shifting the second rotatable member 71 relative to the first rotatable member 51. The shifter 80 includes a shift ring 82 fitted to the second rotatable member 71 and fixed between two retainer clips 83, and a fork member 84 fitted to the shift ring 82. Therefore, the second rotatable member 71 is moved to the leftmost position in FIG. 6(A) relative to the first rotatable member 51 when the retainer clip 83 is brought into contact with the outer side surface of the annular end plate 61, and to the rightmost position when the shoulder portion of the large diameter portion 73 of the second rotatable member 71 is brought into contact with the inner side surface of the annular end plate 61.

Further, the shifter 81 is moved manually and automatically by an actuator (not shown) driven by another mechanism or in response to a control signal.

The function of this fourth embodiment will be described hereinbelow. When the second rotatable member 71 is moved to the rightmost position as shown in FIG. 6(A), since the two cylinder assemblies 65 and 66 are overlapped with a maximum overlap length L and further two window absence zones B of the two adjacent resistance cylinder members are overlapped with each other, a higher torque is transmitted between the two rotatable members 51 and 71 via the viscous fluid.

Under these conditions when the second rotatable member 71 is moved leftward, since the overlap length between the two adjacent resistance cylinder members decreases, a transmission torque decreases. Further, when the second rotatable member 71 is moved to the leftmost position as shown in FIG. 6(B), since the two cylinder assemblies 65 and 66 are overlapped with a minimum overlap length and further the window presence zone A is overlapped with the window absence zone B of the two adjacent resistance cylinder members, a lower torque is transmitted between the two rotatable members 51 and 71.

As described above, it is possible to adjust the transmission torque by sliding the second rotatable member 71 relative to the first rotatable member 51 to change the overlap length of the window-absence zones B of the two cylinder assemblies 65 and 66.

In the above embodiment, the shape, the number, and the arrangement manner of the windows formed in the resistance cylinder member are not limited to those shown in FIG. 7. That is, it is possible to form rectangular, square, circular windows in the resistance cylinder member. Further, it is also possible to form through holes in the window-absence zones B of the resistance cylinder member to increase the transmission torque. Further, it is not necessarily required to match the shape and number of the windows of the first resistance cylinder members with those of the second resistance cylinder members.

As described above in the viscous coupling clutch according to the present invention, since each of the two cylinder assemblies is formed by a resistance cylinder member whose radial wall thickness changes stepwise along the axial direction thereof and therefore the engagement conditions (overlap length and gap width) of the two adjacent resistance cylinder members can be changed markedly stepwise at a short stroke, it is possible to adjust transmission torque within a wide range via the viscous coupling clutch, without increasing the size and cost of the clutch. In addition, since the shift stroke is short, it is possible to save the shift energy and therefore to improve the response speed of the clutch operation.

What is claimed is:

1. A viscous coupling clutch comprising:
   (a) a first rotatable member;
   (b) a second rotatable member rotatably and slidably disposed relative to said first rotatable member so as to form a working chamber filled with a viscous fluid;
   (c) a first cylinder assembly having plural first resistance cylinder members of different diameters and coaxially fixed to said first rotatable member within the working chamber, a radial thickness of each of said first resistance cylinder members changing stepwise along an axial direction thereof;
   (d) a second cylinder assembly having plural second resistance cylinder members of different diameters and coaxially fixed to said second rotatable member within the working chamber, a radial thickness of each of said second resistance cylinder member changing stepwise along the axial direction thereof, said first and second resistance cylinder members being engaged with each other in radially spaced and axially slidable positional relationship to each other so that overlap and gap conditions between said first and second resistance cylinder members change stepwise and therefore viscous coupling conditions change stepwise within the working chamber, when said first and second rotatable members are axially moved relative to each other.

2. The viscous coupling clutch of claim 1, wherein each of said first and second resistance cylinder members of different diameters comprises:
   (a) an axially long cylinder member; and
   (b) an axially short cylinder member attached to an inner circumferential surface of said long cylinder member so that a radial thickness of said resistance cylinder member increases stepwise from a fixed end to a free end thereof.

3. The viscous coupling clutch of claim 1, wherein each of said first and second resistance cylinder members of different diameters comprises:
   (a) an axially long cylinder member;
   (b) a first axially short cylinder member attached to an inner circumferential surface of said long cylinder member; and
   (c) a second axially short cylinder member attached to an outer circumferential surface of said long cylinder member so that a radial thickness of said resistance cylinder member increases stepwise from a fixed end to a free end thereof.

4. The viscous coupling clutch of claim 1, wherein each of said first and second resistance cylinder members of different diameters comprises:
   (a) an axially long cylinder member;
   (b) an axially medium cylinder member attached to an inner circumferential surface of said long cylinder member; and
   (c) an axially short cylinder member attached to an inner circumferential surface of said medium cylinder member so that a radial thickness of said resistance cylinder member increases stepwise from a fixed end to a free end thereof.

5. The viscous coupling clutch of claim 1, wherein each of said first and second resistance cylinder members of different diameters comprises a cylindrical member formed with a plurality of slits arranged in circumferential and axial directions thereof so that a substantial thickness of said resistance cylinder member changes partially stepwise from a fixed end to a free end thereof along an axial direction thereof.

* * * * *